(12) United States Patent
Bonn

(10) Patent No.: US 6,597,661 B1
(45) Date of Patent: Jul. 22, 2003

(54) NETWORK PACKET CLASSIFICATION

(75) Inventor: David Wayne Bonn, Everett, WA (US)

(73) Assignee: WatchGuard Technologies, Inc., Seattle, WA (US)

( * ) Notice: Subject to any disclaimer, the term of this patent is extended or adjusted under 35 U.S.C. 154(b) by 0 days.

(21) Appl. No.: 09/382,568

(22) Filed: Aug. 25, 1999

(51) Int. Cl.$^7$ ............................................. H04L 12/54
(52) U.S. Cl. .................... 370/235; 370/395.32
(58) Field of Search ................. 370/229, 230, 370/230.1, 235, 235.1, 252, 389, 392, 395.2, 395.32, 428, 429

(56) References Cited

U.S. PATENT DOCUMENTS 5,216,670 A * 6/1993 Ofek et al. .................. 370/403
5,526,352 A * 6/1996 Min et al. ................. 370/395.4

OTHER PUBLICATIONS

Cerf, Vinton, et al., "Specification of Internet Transmission Control Program," RFC 675, Dec. 1974, 66 pages.
Postel, Jon, "DOD Standard Transmission Control Protocol," RFC 761, University of Southern California, Information Sciences Institute, Jan. 1980, 87 pages.
Postel, J., "User Datagram Protocol," RFC 768, Univeisty of Southern California, Information Sciences Institute, Aug. 28, 1980, 3 pages.
Postel, Jon, "Transmission Control Protocol, DARPA Internet Program Protocol Specification," RFC 793, University of Southern California, Information Sciences Institute, Sep. 1981, 88 pages.
Hinden, Robert M., "IP Next Gerneration Overview," May 14, 1995, 21 pages http://playground.sum.com/pub/ipng/html/INET–IPng–Paper.html (Accessed Jul. 16, 1999).
Talley, Brooks, "IPv6 cuts address chaos," *Intranets & I–Commerce, Tech Spotlight*, Aug. 24, 1998 (vol. 20, Issue 34), 6 pages http://archive.infoworld.com/cgi–bin/displayArchive.pl?/98/34/ipv6a.dat.htm (Accessed Jul. 16, 1999).

* cited by examiner

*Primary Examiner*—Kwang Bin Yao
(74) *Attorney, Agent, or Firm*—Perkins Coie LLP

(57) ABSTRACT

The present invention is directed to a facility for classifying network packets. The classified network packets each contain a source address, a source port number, a destination address, and a destination port number. The facility first sums the source address, the source port number, the destination address, and the destination port number contained by the packet. The facility then determines the modulo remainder of the sum over a constant predetermined value. The facility uses the determined modulo remainder to classify the packet into a class of packets predicted to relate to the same network session.

30 Claims, 12 Drawing Sheets

NETWORK PACKET CLASSIFICATION

TECHNICAL FIELD

The present invention is directed to the field of computer networking, and more particularly, to the field of network packet processing.

BACKGROUND OF THE INVENTION

In computer networks, information can be transmitted between two connected computer systems, herein termed the "source" and "destination" computer systems. A particular pair of computer systems exchanging information are said to be engaged in a "session."

Many protocols are available for formatting and transmitting this information, such as Transmission Control Protocol ("TCP"), defined in Internet Requests for Comment 675, 761, and 793, currently available at ftp://ftp.isi.edu/in-notes/rfc675.txt, ftp://ftp.isi.edu/in-notes/rfc761.txt, and ftp://ftp.isi.edu/innotes/rfc793.txt, respectively; and User Datagram Protocol ("UDP"), defined in Internet RFC 768, currently available at ftp://ftp.isi.edu/in-notes/rfc768.txt.

Protocols such as TCP and UDP generally specify dividing a body of information to be transmitted into a number of pieces, called "packets," attaching to each packet a "header" containing additional information about the packet, and sending these packets from the source computer system to the destination computer system. Both of the above protocols specify including in each packet header a numerical network address of the source computer system and the destination computer system. They additionally each specify including in each packet header a "port number" for each the source and destination computer system that allows these computer systems to differentiate between packets arriving for different purposes.

In many cases, it is useful to track packets based on the particular network session that they are part of. Packet classification of this sort may be used, for example, to perform packet filtering—determining, for packets addressed to a protected computer system, which to forward to the protected computer system and which to discard. Such classification may also be used to selectively perform packet modification, such as reformatting packet contents, or to perform network traffic analysis. Unfortunately, existing approaches to classifying packets to identify the network sessions to which they belong each have significant disadvantages. Accordingly, a new, more effective approach to classifying packets to identify the network sessions to which they belong would have considerable utility.

DETAILED DESCRIPTION OF THE INVENTION

The present invention provides an approach to classifying network packets. In a preferred embodiment, a packet is classified based on the sum of its source address, source port number, destination address, and destination port In particular, a packet is classified by assigning it a hash value equal to the modulo remainder of the above sum over a constant value. Classifying packets using this hashing function both provides an excellent hashing distribution and groups together packets exchanged in different directions in the same network session.

In one preferred embodiment, this packet classification scheme is utilized in a software facility for network packet filtering ("the facility"). The facility operates in a computer system or other device that protects a group of protected computer systems from unauthorized packets. The computer system upon which the facility executes receives the packets addressed to the protected computer system ("inbound packets") and the packets sent from the protected computer system ("outbound packets"), and determines whether to forward them to their destination. In that connection, the facility maintains a hash table, into which it indexes with the hash values of the packets it receives. When an outbound packet is received, it is treated as an indication that future corresponding inbound packets should be forwarded, until an end-of-session packet is received or a timeout period elapses. In that connection, authorization records are stored in the hash table identifying inbound packets that are to be forwarded rather than discarded.

In various alternative embodiments of the packet filtering facility, different levels of information are stored to identify authorized packets. In one preferred embodiment, each bucket of the hash table may contains a list of authorization records. Each authorization record contains information identifying a network session and representing the authority to forward packets that are part of the network session. In certain further preferred embodiments, such records contain an expiration time after which such authorization expires, and/or a specific identification of the end of the session whose packets are authorized.

The packet classification scheme of the present invention is further adapted to use in other network administration applications, including network traffic analysis, such as network traffic modeling, or network packet processing, such as reformatting or translating data contained in certain network packets.

Figure 1:
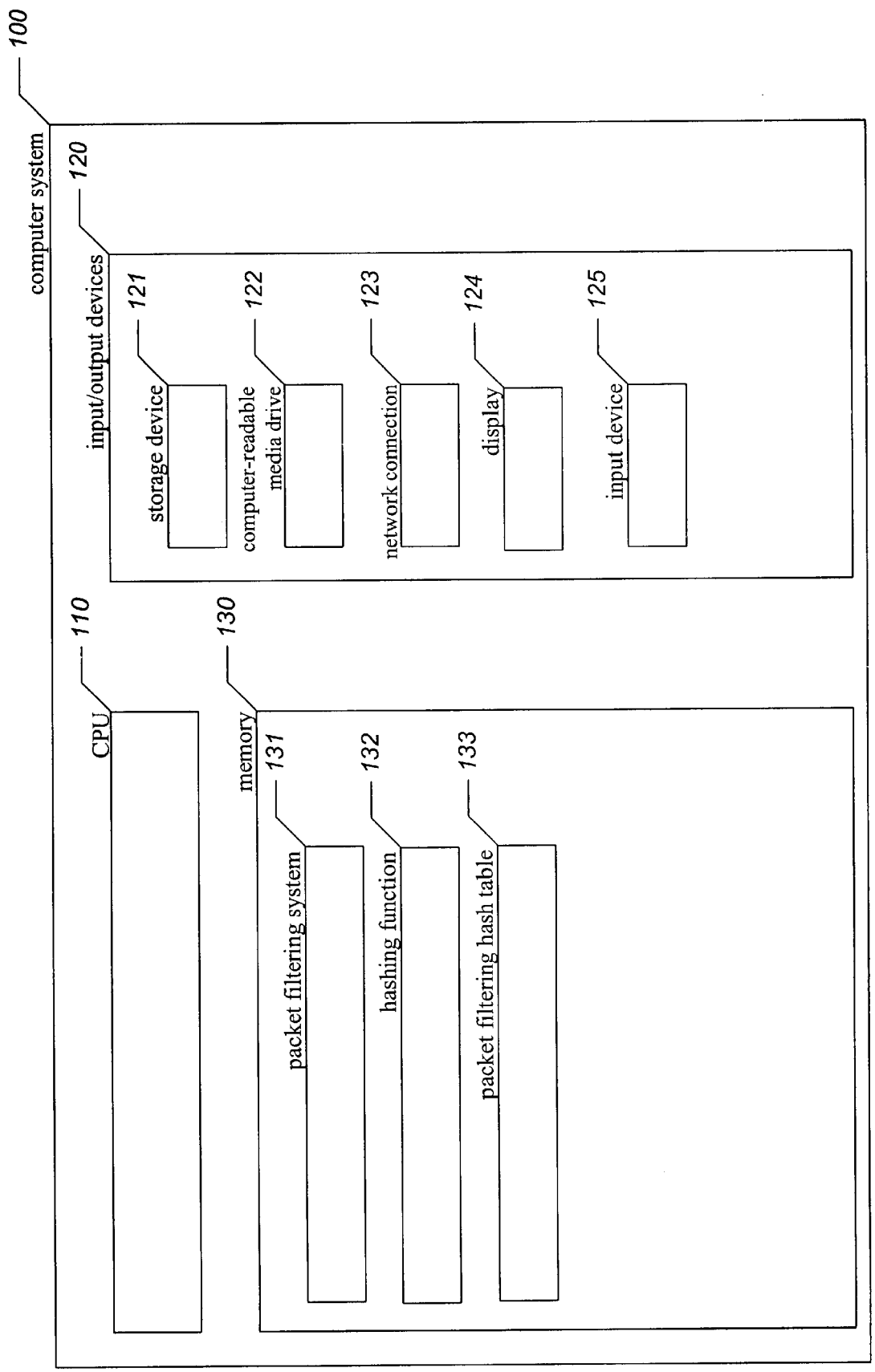
FIG. 1 is a high-level block diagram of the general-purpose computer system upon which the facility preferably executes.

FIG. 1 is a high-level block diagram of the computer system upon which the facility preferably executes. The computer system 100 contains one or more central processing units (CPUs) 110, input/output devices 120, and a computer memory (memory) 130. Among the input/output devices is a storage device 121, such as a hard disk drive, and a computer-readable media drive 122, which can be used to install software products, including components of the facility, which are provided on a computer-readable medium, such as a CD-ROM. The input/output devices also include a network connection 123, through which the computer system 100 may communicate with other connected computer systems, and through which the facility receives network packets for filtering. The memory 130 preferably contains the packet filtering facility 131, as well as a hashing function 132 and a packet filtering hash table 133 used by the facility. While the facility is preferably implemented on a computer system configured as described above, those skilled in the art will recognize that it may also be implemented on computer systems having different configurations. In particular, the facility may be implemented in a dedicated network security device, a dedicated network analysis device, a router, or other types of specialized network hardware.

Figure 2:
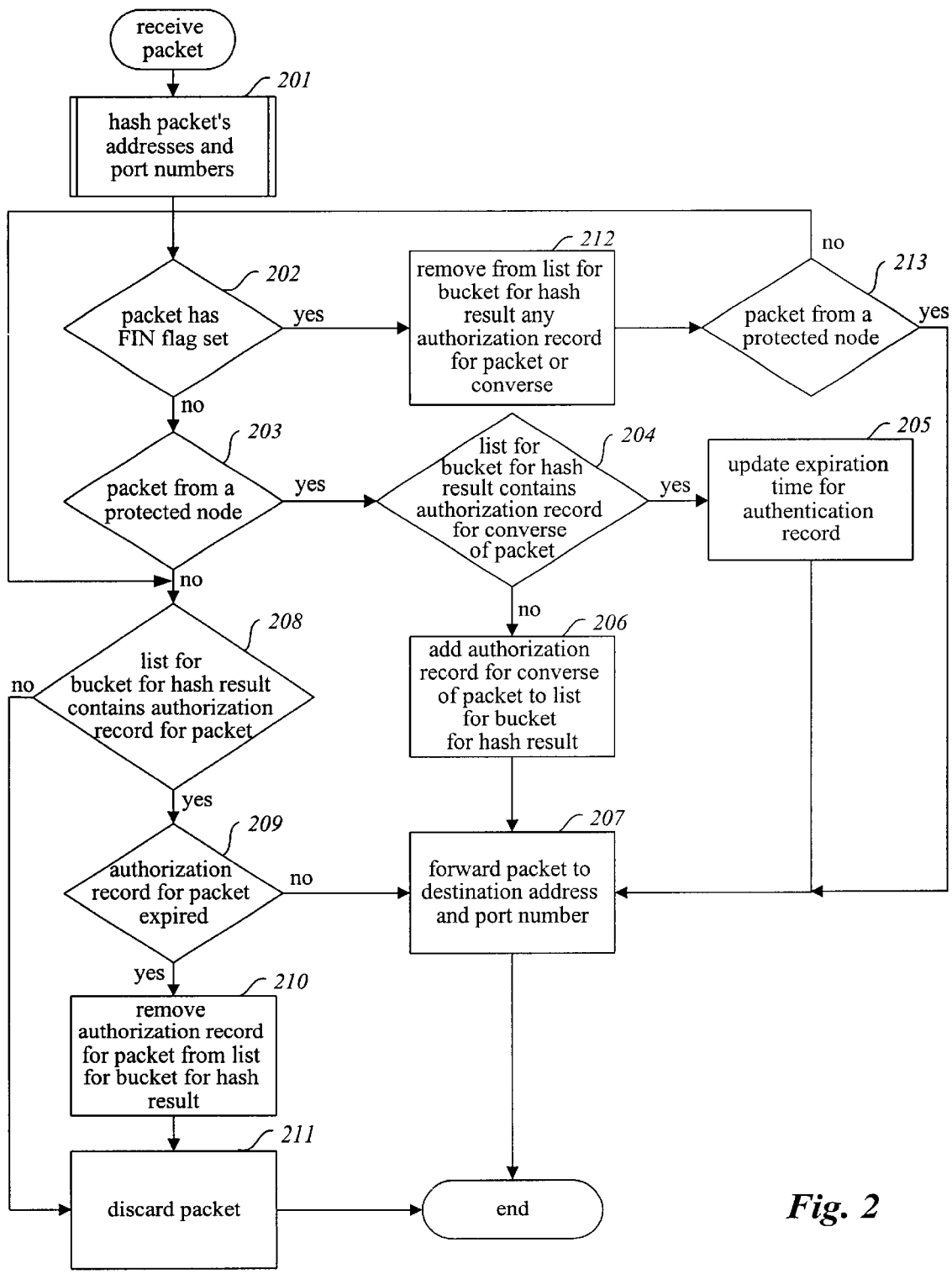
FIG. 2 is a flow diagram showing the steps preferably performed by the packet filtering facility for each packet received.

FIG. 2 is a flow diagram showing the steps preferably performed by the packet filtering facility for each packet received. In step 201, the facility invokes the hash function in order to produce a hash result value for the received packet based upon its source address, source port number, target address, and target port number.

Figure 3:
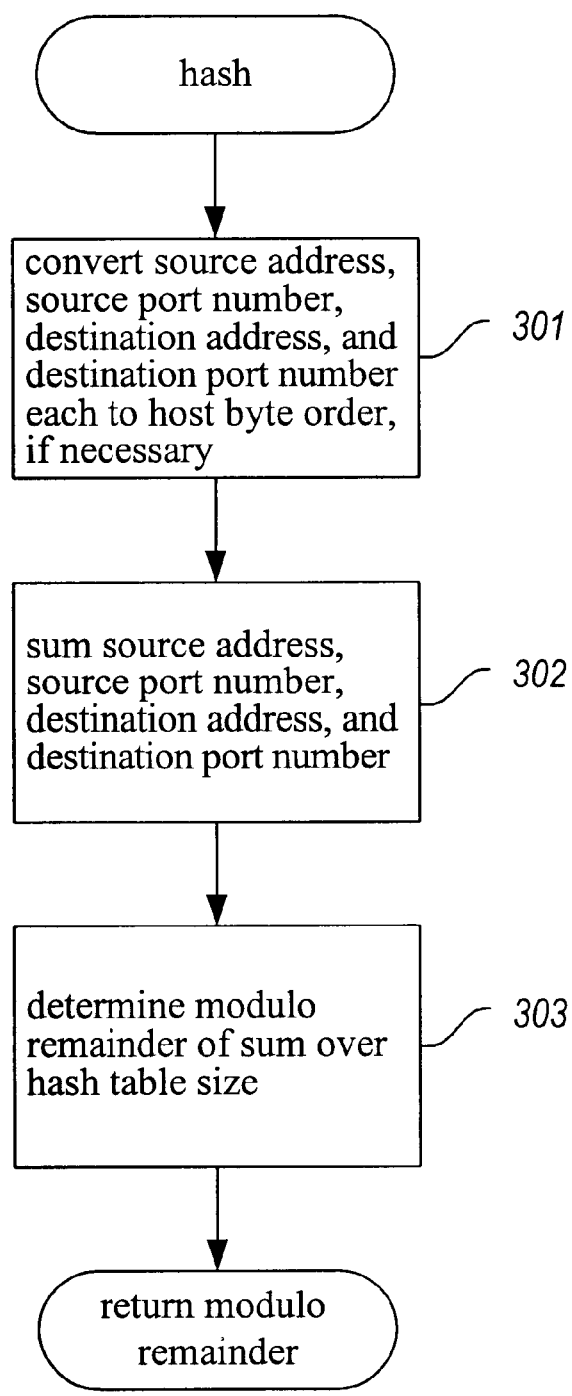
FIG. 3 is a flow diagram showing the steps performed by the hash function.

FIG. 3 is a flow diagram showing the steps performed by the hash function. In step 301, the hash function converts the source address, source port number, destination address, and destination port number for the current message each to host byte order, if necessary. Version 4 of the Internet Protocol standard ("IPv4") specifies that numerical network addresses in an IP network ("IP addresses") are unsigned 32-bit integers, made up of 48-bit bytes that are transmitted in order from the most significant byte to the least significant byte. This ordering is called "network standard byte order." (In version 6, or IPv6, IP addresses are unsigned 128-bit integers having the same bit ordering.) An example of a version 4 IP address is shown on line (1):

10000000 00001010 00000010 00011110     (1)

IP addresses are often expressed in what is called "dotted decimal notation," in which the bytes are shown as decimal integers separated by decimal points. Accordingly, the IP address shown on line (1) may be expressed as:

128.10.2.30     (2)

By performing the act of storing a transmitted IP address in memory by storing the first and highest-order byte at an initial memory location, and each successively lower-order byte at the next higher memory location, a computer system preserves the byte ordering, called "Big Endian" shown on line (1). Some computer systems internally represent integers using this Big Endian byte ordering. On these computer systems, IP addresses can be stored in memory as described above and immediately operated upon as 32-bit integer values. Other computer systems, however, use different byte orderings to represent integers. For example, some computer systems use Little Endian byte ordering, in which the lowest-order byte is stored in the lowest memory location and each successively higher-order byte is stored at the next higher memory location. Networked computer systems that use byte ordering schemes other than Big Endian generally have functions for converting between Big Endian network standard byte order and their internal order, called "host order." For example, on a computer system using Little Endian byte ordering, the Unix function ntohl( ) converts the value on line (1) in Big Endian network standard byte order to the representation on line (3) in Little Endian host order:

00011110 00000010 000001010 10000000     (3)

The Unix function ntohl() converts long 4-byte integers from network standard byte order to host order, while the Unix function ntohs() converts short 2-byte integers from network standard byte order to host order. ntohs() may be used in the same manner to convert port numbers, which are 2-byte integers, from network standard byte order to host order. Accordingly, in step 301, the hash function preferably uses the ntohl() and ntohs() functions to convert the addresses and port numbers, respectively, of the message to host byte order.

In step 302, the facility sums the source address, source port number, destination address, and destination port number. In step 303, the facility determines the modulo remainder of the sum over the hash table size. The hash table size is preferably chosen to be a value that is not a power of 2 and that further is a prime number. The table size is preferably based on the expected number of simultaneous sessions for which the packet filtering facility is expected to filter packets. For example, for about 500 simultaneous sessions, a table size of 2047 is preferably chosen. After step 303, the function returns the modulo remainder determined in step 303 as the hash result value. To summarize, hashing function can be expressed mathematically as:

(ntohs(source address)+ntohs(source port number)+ntohl(destination address)+ntohs(destination port number)) mod (table size)     (4)

Returning to FIG. 2, in step 202, if the FIN flag is set in the packet, indicating that the packet marks the end of its session, then the facility continues at step 212, else the facility continues at step 203. In step 203, if the packet is from a protected node, then the facility continues in step 204 to process the packet as an outbound packet, else the facility continues in step 208 to process the packet as an inbound packet. In one preferred embodiment, the facility performs the determination of step 203 by determining whether the source address and source port number of the packet correspond to a list of network nodes for which the facility is assigned to filter packets. In an alternative preferred embodiment, the determination of step 203 is performed by determining whether the packet was received via a network connection to protected nodes, or via a separate network connection to unprotected nodes.

In step 204, if the list of authorization records for the bucket for the outbound packet's hash result contains an authorization record for the converse of this packet—that is, an inbound packet that is part of the same session as the received outbound packet—then the facility continues in step 205, else the facility continues in step 206. In step 205, the facility updates the expiration time for the preexisting authentication record for the converse of this packet. After step 205, the facility continues in step 207. In step 206, the facility adds an authorization record for the converse of the packet to the list of authorization records for the bucket for the packet's hash result. In step 207, the facility forwards the packet to its destination address and port number. After step 207, these steps conclude.

In step 208, in order to process the inbound packet, if the list of authorization records for the bucket for the packet's hash result contains an authorization record for the packet, then the facility continues in step 209, else the facility continues in step 211. In step 209, if the authorization record for the packet is expired, that is, if the current time is later than the expiration time for the authorization record, then the facility continues in step 210, else the facility continues in step 207 to forward the packet. In step 210, the facility removes the authorization record for the packet from the list for the bucket for the packet's hash result. Then, in step 211, the facility discards the packet. After step 211, these steps conclude.

In step 212, because a FIN packet has been received, the facility removes from the list of authorization records for the bucket for the packet's hash result any authorization record for the packet or its converse. In step 213, if the packet is from a protected node, then the facility continues in step 207 to forward the packet, else the facility continues in step 208 to process the inbound packet.

In a further preferred embodiment, steps 204 and 208 involve traversing part or all of the list for the bucket for the hash result. During such traversal, the facility preferably identifies and removes any authorization records in the list that have expired.

Figure 4A:
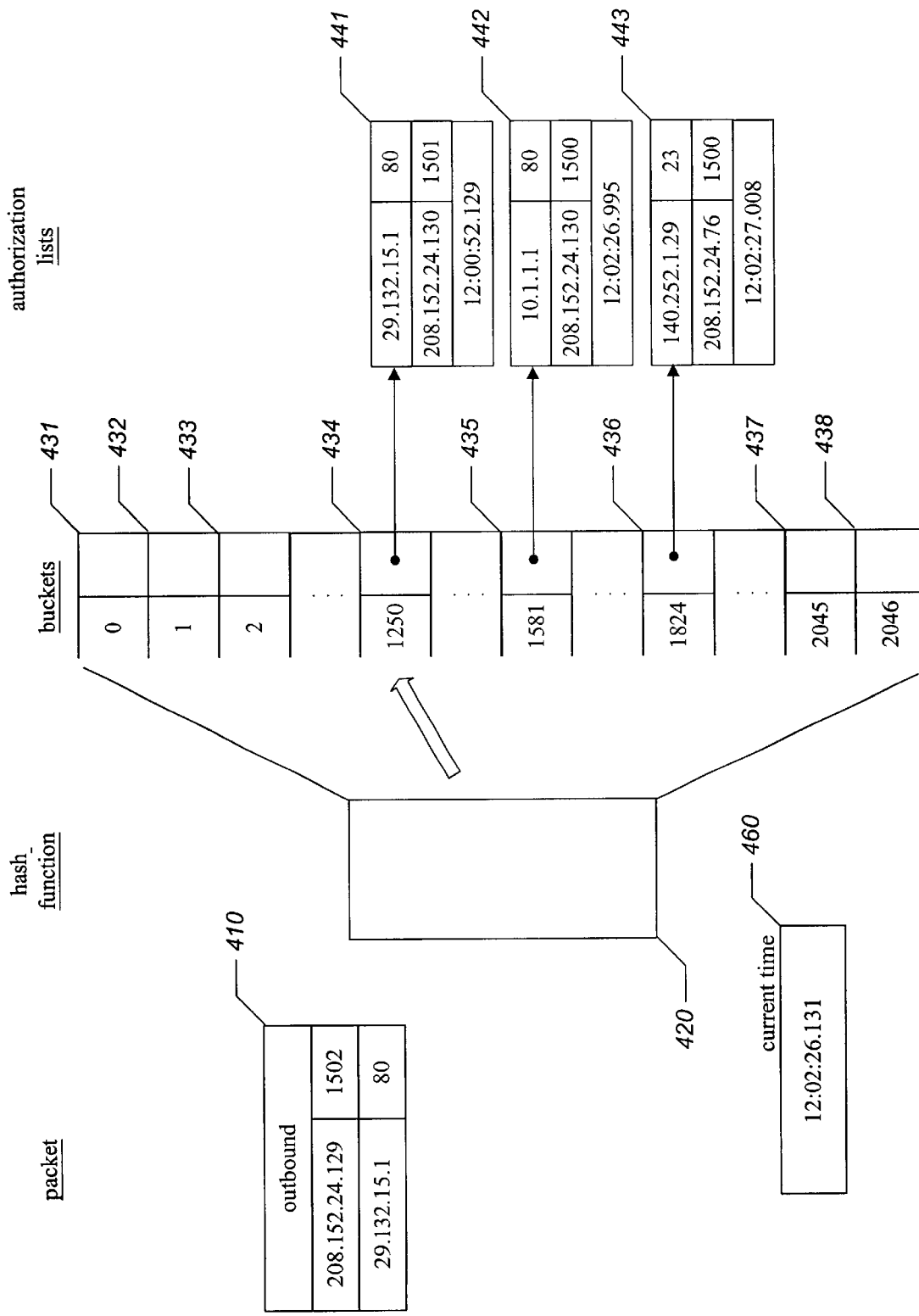
FIGS. 4A, 4B, and 4C are data structure diagrams showing the processing of an outbound packet.

FIGS. 4A–7B show examples of the operation of the facility. FIGS. 4A, 4B, and 4C are data structure diagrams showing the processing of an outbound packet. The diagrams show a representation of the outbound packet 410; the hash function 420; the hash table buckets, such as buckets 431–438; and the lists of authorization records associated with each nonempty bucket, such as the list containing authorization record 441 associated with bucket 434, the list containing authorization record 442 associated with bucket 435, and the list containing authorization record 443 associated with bucket 436. Each authorization record in a list is an authorization to forward inbound packets, and contains the source address and port number and destination address and port number of the authorized inbound packets, as well as an expiration time at which the authorization expires. For example, authorization record 441 represents an authorization to forward inbound packets having source address 29.132.15.1, source port number 80, destination address 208.152.24.130, and destination port number 1501. This authorization expires at time 12:00:52.129. Such an inbound packet would have a hash value of 1250, the hash value of bucket 434. Because of the symmetry of the hash function with respect to source node information and destination node information, outbound packets for the same session will also have hash result 1250. Finally, the data structure diagram includes an indication 460 that the current time is 12:02:26.131.

When outbound packet 410 is received and the hash function applied, the hash result of 1250, is obtained as follows:

(source address+source port number+destination address+destination port number) mod (table size)=(3449297025+1502+495193937+80) mod 2047=3944492464 mod 2047=1250

Figure 4B:
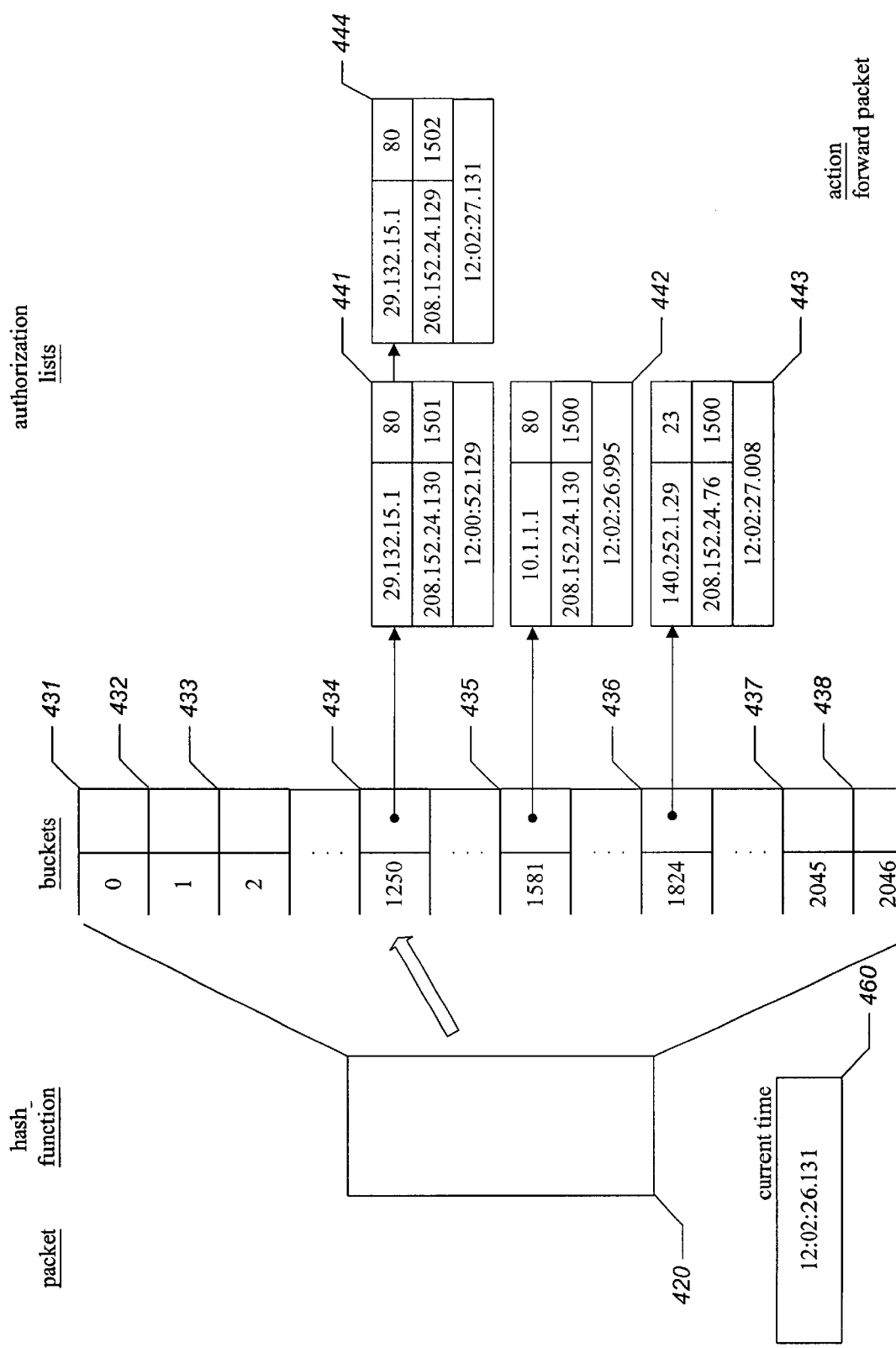

FIG. 4B shows that, because outbound packet 410 has hash result 1250, a new authorization record 444 is added to the list of authorization records for bucket 434 for hash value 1250. FIG. 4B further indicates that packet 410, because it is an outbound packet, is forwarded to its destination.

Figure 4C:
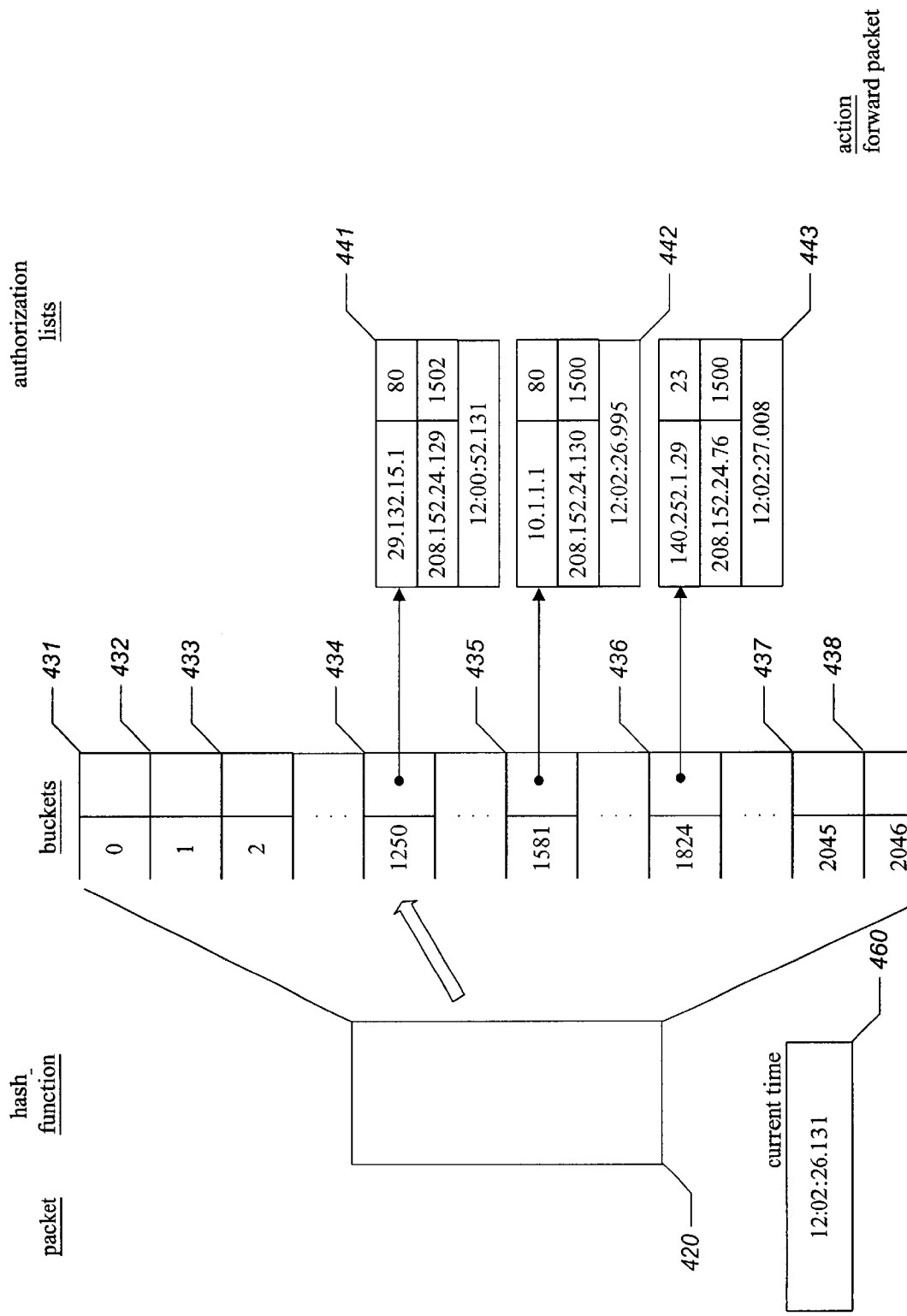

FIG. 4C shows the optional garbage collection feature of the facility. In determining whether the list of authorization records for hash value 1250 already contains an authorization record for inbound packets that are part of the same session as outbound packet 410, one embodiment of the facility preferably checks each traversed authorization record to determine whether its expiration time has passed. Because the expiration time of authorization record 441, 12:00:52.129, is earlier than current time 460, 12:02:26.131, FIG. 4C shows that the facility has removed authorization record 441 from the list of authorization records for hash value 1250.

Figure 5A:
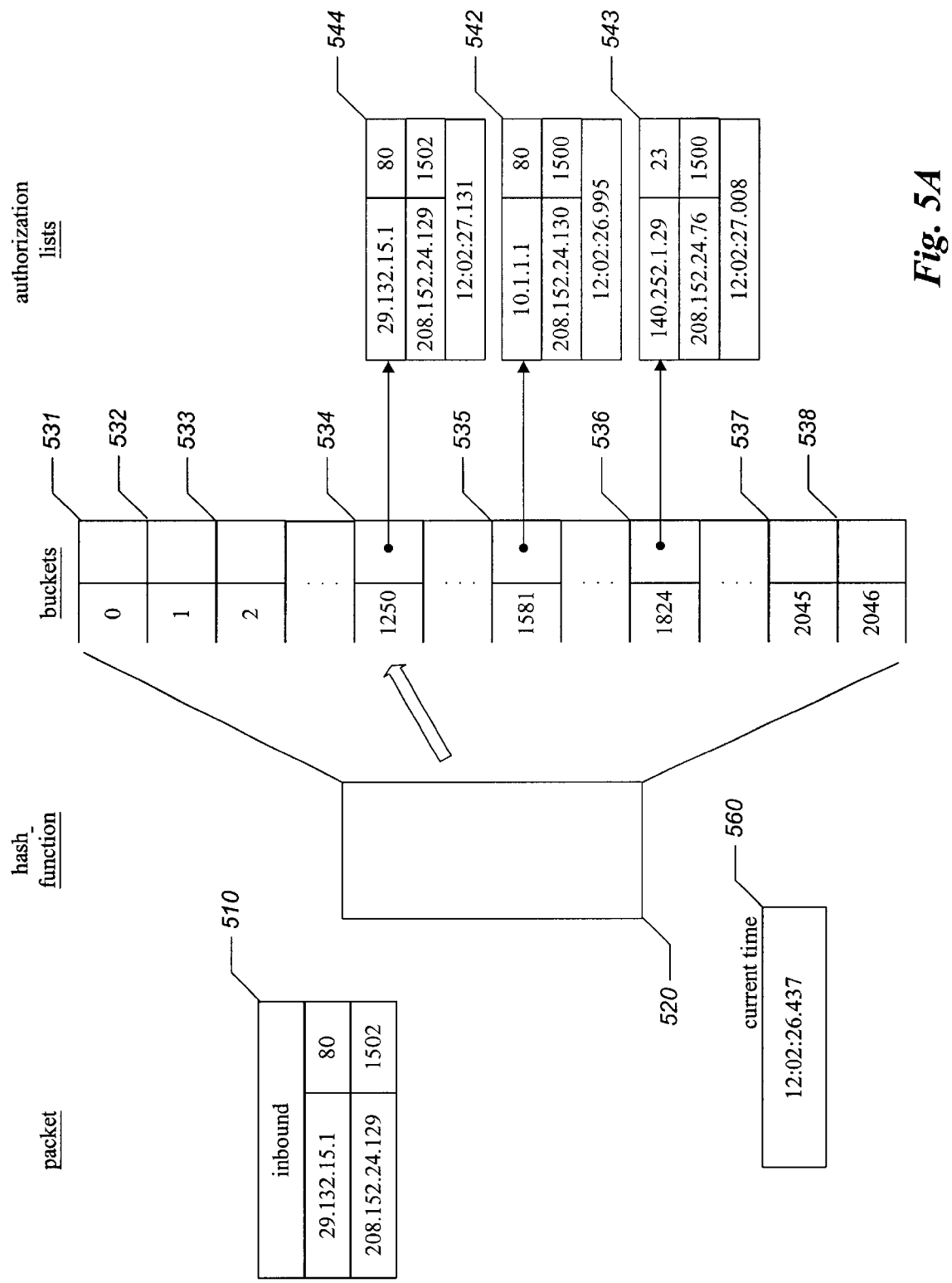
FIGS. 5A and 5B are data structure diagrams showing the processing of an authorized inbound packet.
Figure 5B:
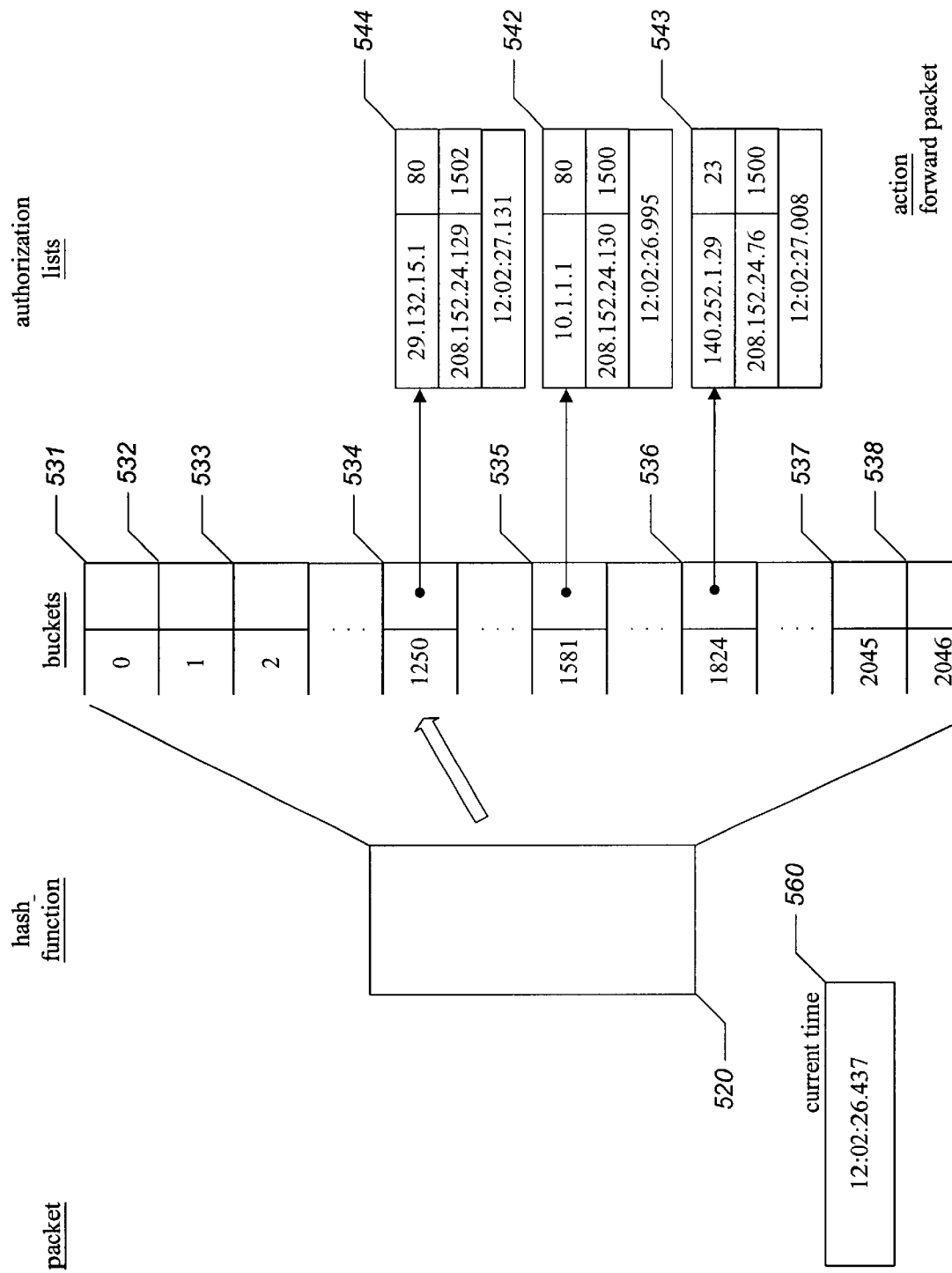

FIGS. 5A and 5B are data structure diagrams showing the processing of an authorized inbound packet. FIG. 5A shows inbound packet 510 which has source address 29.132.151.1, source port number 80, destination address 208.152.24.129, and destination port number 1502. In order to determine whether to forward the packet, the facility determines whether a hash table contains an authorization record for such an inbound packet. The facility subjects the inbound packet 510 to the hash function to yield hash result 1250. It then searches the list of authorization records for hash result 1250 to determine whether the list contains an unexpired authorization record for this packet. The facility finds authorization record 444, which specifies the same source address and port number and destination address and port number as inbound packet 510. Further, the authorization record is unexpired as its expiration time, 12:02:27.131, is later than the current time 560, 12:02.26.437. For this reason, FIG. 5B shows that the facility forwards the inbound packet in accordance with the unexpired authorization record.

Figure 6A:
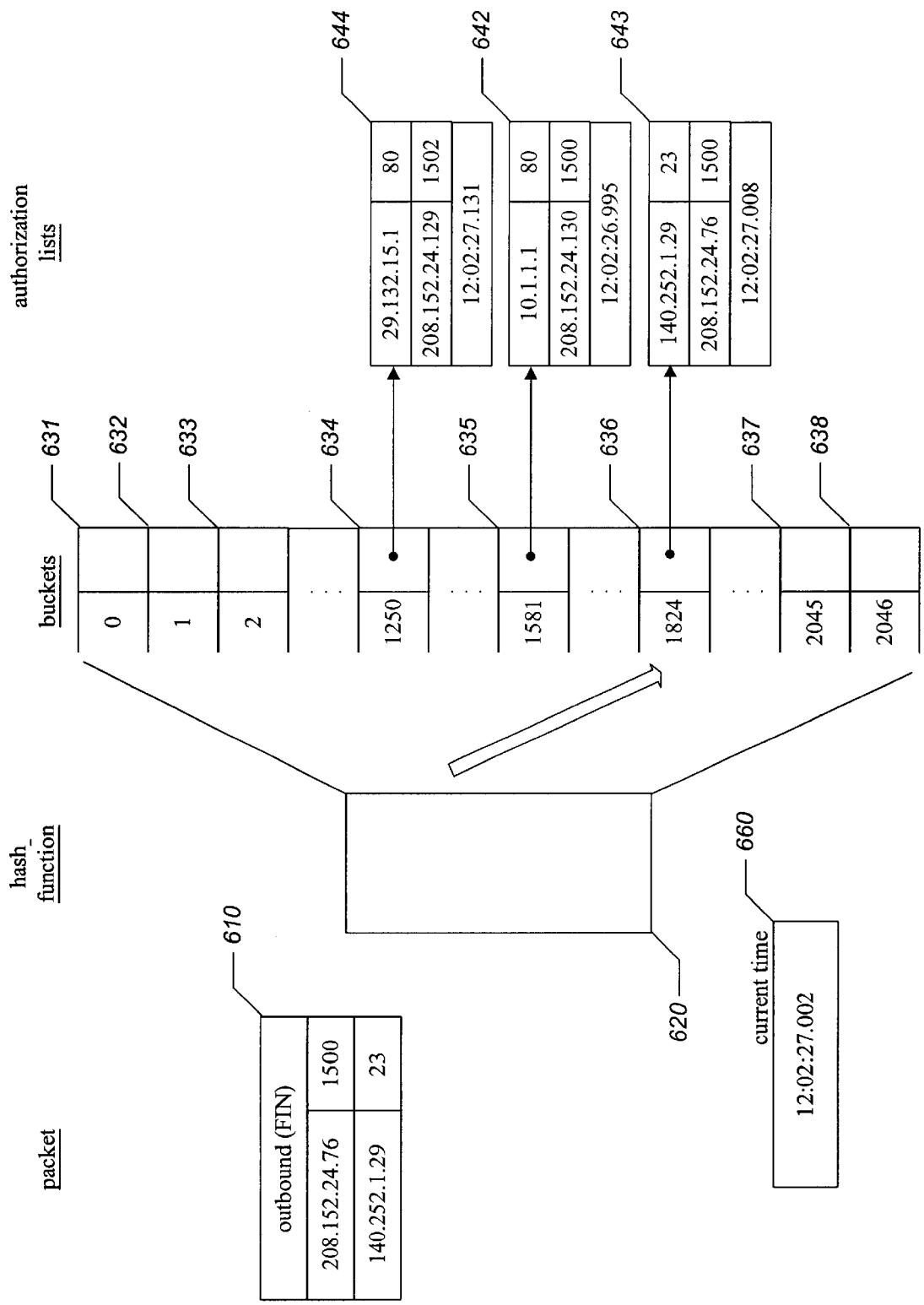
FIGS. 6A and 6B are data structure diagrams showing the processing of an end-of-session, or "FIN" packet.
Figure 6B:
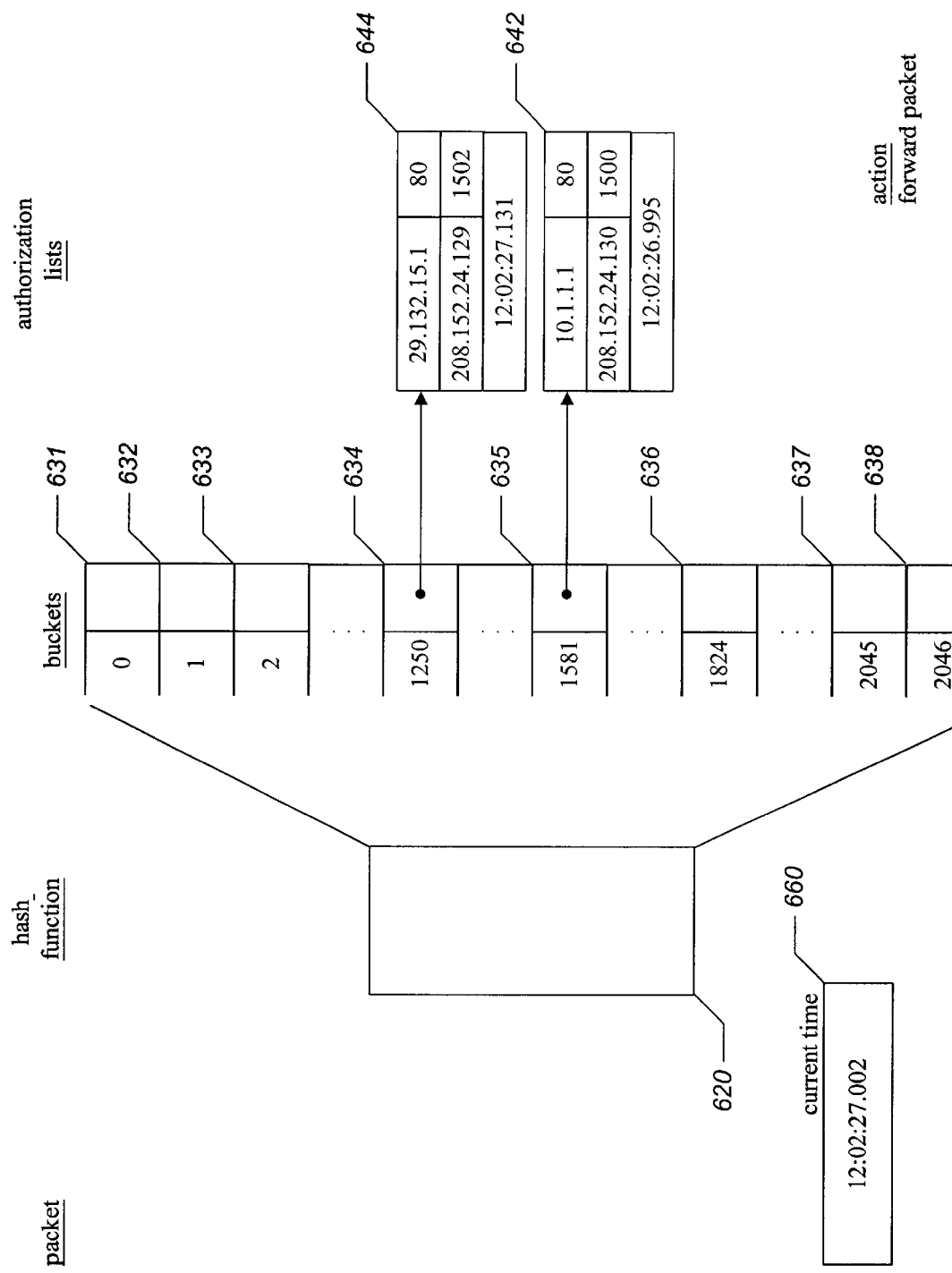

FIGS. 6A and 6B are data structure diagrams showing the processing of an end-of-session, or "FIN" packet. The FIN packet 610 hashes to hash result 1824. The facility searches in the list of authorization records for hash result 1824 for an authorization record matching packet 610 or its converse. In doing so, the facility identifies authorization record 643 and, though this authorization record has not yet expired, FIG. 6B shows that the facility removes authorization record 643 in response to the FIN packet. FIG. 6B further shows that the facility forwards the outbound FIN packet to its destination.

Figure 7A:
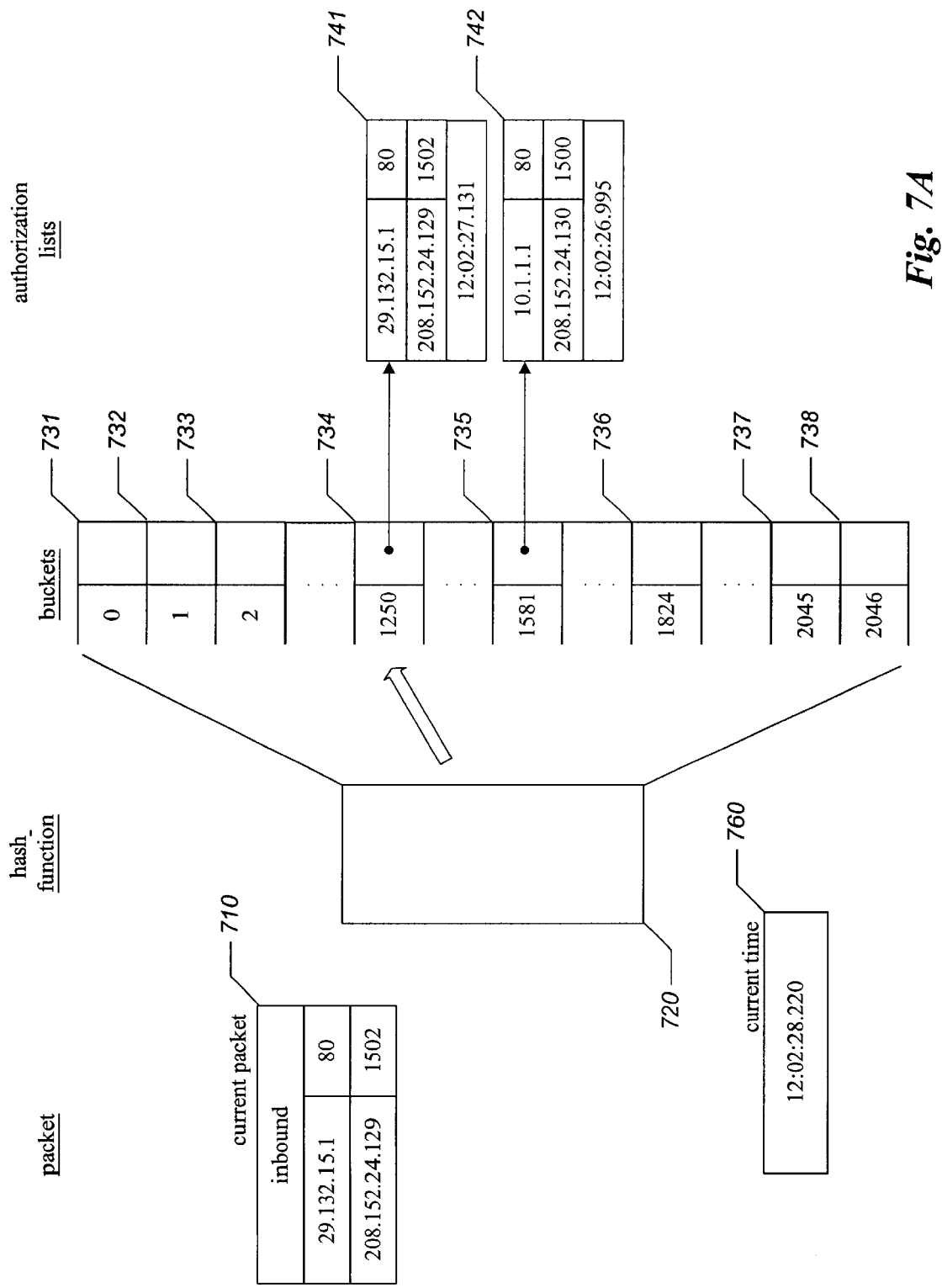
FIGS. 7A and 7B are data structure diagrams showing the processing of an inbound packet whose authorization record has expired.
Figure 7B:
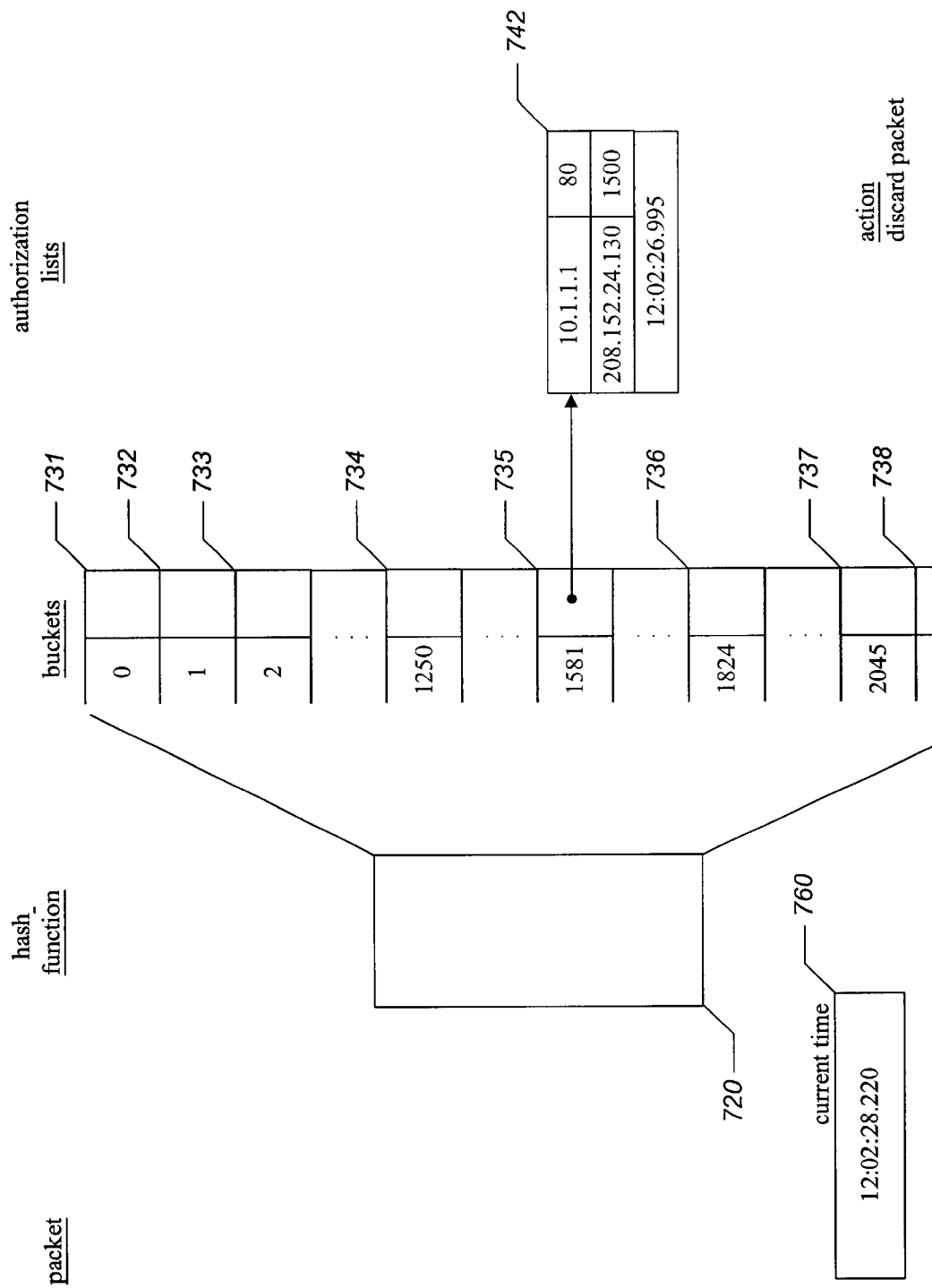

FIGS. 7A and 7B are data structure diagrams showing the processing of an inbound packet whose authorization record has expired. When the facility applies the hashing function to inbound packet 710 it obtains a hash result of 1250. The facility searches the list of authorization records for hash result 1250, and identifies authorization record 741 as matching the inbound packet 710. Because the expiration time of authorization record 741, 12:02:27.131, is earlier than the current time 760, 12:02:28.220, FIG. 7B shows that the facility removes authorization record 741 and discards inbound packet 710.

While this invention has been shown and described with reference to preferred embodiments, it will be understood by those skilled in the art that various changes or modifications in form and detail may be made without departing from the scope of the invention. For example, other hashing functions that combine the source address and part number and destination address and part number, or a different combination of packet header values, may be used. Also, the hash function may be straightforwardly used for any application that involves classifying network products. Further, while the hash function is discussed above with respect to messages conforming to Internet protocols such as TCP and UDP, those skilled in the art will recognize that the hash function may be straightforwardly applied to packets, or other units of data transmission, conforming to other network protocols.

I claim:

1. A method in a computer system for authorizing network packets sent from a source address and port number to a destination address and port number, the method utilizing a packet authorization data structure containing numbered buckets, comprising:

receiving a first packet sent from a trusted source address and port number;

generating an index key for the first packet by summing its source address, source port number, destination address, and destination port number, then determining the remainder when the sum is divided by a predetermined constant value;

to a bucket having as its number the index key generated for the first packet, adding a packet authorization record specifying the source address and port number and destination address and port number of the first packet, the added packet authorization record further specifying an expiration time for the packet authorization record;

forwarding the first packet to its destination address and port number;

receiving a second packet sent to a trusted destination address and port number;

generating an index key for the second packet by summing its source address, source port number, destination address, and destination port number, then determining the remainder when the sum is divided by the predetermined constant value;

in a bucket having as its number the index key generated for the second packet, identifying a packet authorization record specifying the source address and port number and destination address and port number of the second packet;

if the expiration time specified by the identified packet authorization record indicates that the identified packet authorization record has not yet expired, forwarding the second packet to its destination address and port number; and if the expiration time specified by the identified packet authorization record indicates that the identified packet authorization record has expired, omitting to forward the second packet to its destination address and port number.

2. The method of claim 1, further comprising:

receiving a third packet sent to a trusted destination address and port number;

generating an index key for the third packet by summing its source address, source port number, destination address, and destination port number, then determining the remainder when the sum is divided by the predetermined constant value;

determining that a bucket having as its number the index key generated for the third packet contains no packet authorization record specifying the source address and port number and destination address and port number of the third packet; and in response to determining that a bucket having as its number the index key generated for the third packet contains no packet authorization record specifying the source address and port number and destination address and port number of the third packet, omitting to forward the third packet to its destination address and port number.

3. The method of claim 1, further comprising:

at a time after receiving the first packet, receiving a third packet sent from the same trusted source address and port number as the first packet;

generating an index key for the third packet by summing its source address, source port number, destination address, and destination port number, then determining the remainder when the sum is divided by the predetermined constant value;

in a bucket having as its number the index key generated for the third packet, identifying a packet authorization record specifying the source address and port number and destination address and port number of the third packet; and modifying the packet authorization record specifying the source address and port number and destination address and port number of the third packet to specify a later expiration time than it presently specifies.

4. The method of claim 1, further comprising:

if the expiration time specified by the identified packet authorization record indicates that the identified packet authorization record has expired, removing the identified packet authorization record from the bucket having as its number the index key generated for the first packet.

5. The method of claim 1 wherein the method further comprises, incident to the step of identifying a packet authorization record specifying the source address and port number and destination address and port number of the second packet:

identifying an expired packet authorization record in the identified bucket; and in response to identifying an expired packet authorization record, removing the identified expired packet authorization record from the bucket having as its number the index key generated for the third packet.

6. A method in a computer system for classifying a network packet, the network packet containing a source address, a source port number, a destination address, and a destination port number, comprising:

summing the source address, source port number, destination address, and destination port number contained by the packet;

determining the modulo remainder of the sum over a constant predetermined value; and classifying the packet based upon the modulo remainder.

7. The method of claim 6 wherein the method classifies the packet into a class of packets predicted to relate to the same network session.

8. The method of claim 6, further comprising, before summing, ensuring that the source address, source port number, destination address, and destination port number are each arranged in host byte order.

9. The method of claim 6 wherein the computer system has access to a packet information data structure having a plurality of numbered buckets, at least some of the buckets having a list of information items, the method further comprising:

identifying a bucket having the determined modulo remainder as its number; and accessing an information item in the list of information items associated with the identified bucket corresponding to the network packet.

10. The method of claim 6 wherein the computer system has access to a packet information data structure having a plurality of numbered buckets, the method further comprising:

identifying a bucket having the determined modulo remainder as its number, the identified bucket having associated with it a packet history indication; and updating the packet history indication associated with the identified bucket to reflect the network packet.

11. The method of claim 10 wherein the packet history indication associated with the identified bucket is a flag, and wherein the method updates the packet history indication associated with the identified bucket by setting the flag.

12. The method of claim 10 wherein the packet history indication associated with the identified bucket is a counter having a value, and wherein the method updates the packet history indication associated with the identified bucket by augmenting the value of the counter.

13. The method of claim 10 wherein the packet history indication associated with the identified bucket is a list of items, and wherein the method updates the packet history indication associated with the identified bucket by adding an item explicitly identifying the source address, source port number, destination address, and destination port number of the network packet.

14. The method of claim 10 wherein the packet history indication associated with the identified bucket is a list of items, and wherein the method updates the packet history indication associated with the identified bucket by modifying the contents of an item explicitly identifying the source address, source port number, destination address, and destination port number of the network packet.

15. The method of claim 10 wherein the packet history indication associated with the identified bucket is a list of items, and wherein the method updates the packet history indication associated with the identified bucket by removing from the list an item explicitly identifying the source address, source port number, destination address, and destination port number of the network packet.

16. The method of claim 6 wherein the computer system has access to a session information data structure having a plurality of numbered buckets, the method further comprising:

identifying a bucket having the determined modulo remainder as its number, the identified bucket having associated with it a list of session status items, each session status item identifying a network session by indicating both a network address and a port number for each of two session ends, each session status item further indicating status of the network session that it identifies;

identifying in the list of session status items associated with the identified bucket a session status item indicating network addresses and port numbers matching those of the packet; and updating the status indication of the identified session status item to reflect transmission of the network packet.

17. The method of claim 6 wherein the computer system has access to a packet processing information data structure having a plurality of numbered slots, the method further comprising:

identifying a slot having the determined modulo remainder as its number, the identified slot having associated with it a list of packet processing items, each packet processing item identifying a class of packets and indicating a way in which to process packets of the identified class;

identifying in the list of packet processing items associated with the identified slot a packet processing item identifying a packet class containing the packet; and processing the packet in accordance with the processing indication of the identified item.

18. The method of claim 17 wherein the identified packet processing item indicates a manner in which the contents of the packet are to be reformatted, and wherein the method processes the packet by reformatting the packet in the indicated manner.

19. The method of claim 17 wherein the identified packet processing item indicates a manner in which the contents of the packet are to be translated, and wherein the method processes the packet by translating the packet in the indicated manner.

20. The method of claim 6 wherein the computer system has access to a packet filtering data structure having a plurality of numbered slots, the method further comprising:

identifying a slot having the determined modulo remainder as its number, the identified slot having associated with it a list of packet filtering items, each packet filtering item identifying a class of packets and indicating a condition under which packets of the identified class are to be forwarded;

identifying in the list of packet filtering items associated with the identified slot a packet filtering item identifying a packet class containing the packet;

if the condition indicated by the identified item is satisfied, forwarding the packet; and if the condition indicated by the identified item is not satisfied, omitting to forward the packet.

21. The method of claim 6 wherein the computer system has access to a network traffic analysis data structure having a plurality of numbered slots, the method further comprising:

identifying a slot having the determined modulo remainder as its number, the identified slot having associated with it a list of packet history items, each packet history item identifying a class of packets and containing information about foregoing packets within the identified class;

identifying in the list of packet history items associated with the identified slot a packet history item identifying a packet class containing the packet; and updating the information contained by the identified item to reflect the transmission of the packet.

22. The method of claim 21 further comprising the steps of generating a model of network traffic using the contents of the network traffic analysis data structure.

23. A computer-readable medium whose contents cause a computer system to classify a network packet, the network packet containing a source address, a source port number, a destination address, and a destination port number, by:

mathematically combining the source address, source port number, destination address, and destination port number contained by the packet;

determining the modulo remainder of the sum over a constant predetermined value; and classifying the packet into a class of packets predicted to relate to the same network session based upon the modulo remainder.

24. The computer-readable medium of claim 23 wherein the source address, source port number, destination address, and destination port number are mathematically combined using addition.

25. The computer-readable medium of claim 23 wherein the computer system has access to a packet information data structure having a plurality of numbered buckets, at least some of the buckets having a list of information items, and wherein the contents of the computer-readable medium further cause the computer system to:

identify a bucket having the determined modulo remainder as its number; and access an information item in the list of information items associated with the identified bucket corresponding to the network packet.

26. The computer-readable medium of claim 23 wherein the computer system has access to a session information data structure having a plurality of numbered buckets, and wherein the contents of the computer-readable medium further cause the computer system to:

identify a bucket having the determined modulo remainder as its number, the identified bucket having associated with it a list of session status items, each session status item identifying a network session by indicating both a network address and a port number for each of two session ends, each session status item further indicating status of the network session that it identifies;

identify in the list of session status items associated with the identified bucket a session status item indicating network addresses and port numbers matching those of the packet; and update the status indication of the identified session status item to reflect transmission of the network packet.

27. A computer system for classifying a network packet, the network packet containing a source address, a source port number, a destination address, and a destination port number, comprising:

an addition subsystem that sums the source address, source port number, destination address, and destination port number contained by the packet;

a modular arithmetic subsystem that determine the modulo remainder of the sum over a constant predetermined value; and an classification subsystem that classifies the packet based upon the modulo remainder.

28. A memory containing a network session data structure for storing information relating to network sessions, each network session having two ends and a network address and port number for each end, comprising:

a plurality of n buckets, each bucket having a number between zero and n−1 and being associated with a list of session information items that each relate to a network session having the property that m modulo n is the number of the bucket, wherein m is the sum of the network addresses and port numbers for both ends of the network session, and wherein m is an integer$\geq 1$ and n is an integer$\geq 2$, such that a session information item relating to a particular network session having a first end with network address a and port number b and a second end with network address c and port number d may be found in the list associated with the bucket having number (a+b+c+d) mod n, wherein a, b, c, and d are integers$\geq 1$.

29. The memory of 28 wherein the list associated with each bucket is nonempty.

30. The memory of 28 wherein n is not a power of two.

* * * * *

UNITED STATES PATENT AND TRADEMARK OFFICE
CERTIFICATE OF CORRECTION

PATENT NO. : 6,597,661 B1
DATED : July 22, 2003
INVENTOR(S) : David Wayne Bonn

It is certified that error appears in the above-identified patent and that said Letters Patent is hereby corrected as shown below:

Title page,
Item [56], References Cited, OTHER PUBLICATIONS, "Univeisty" should be
-- University --;

Column 2,
Line 10, insert -- number. -- between "port" and "In";

Column 4,
Line 67, "result" should be -- results --;

Signed and Sealed this

Twenty-third Day of December, 2003

JAMES E. ROGAN
*Director of the United States Patent and Trademark Office*